US006003874A

United States Patent [19]

Kuhn et al.

[11] Patent Number: 6,003,874

[45] Date of Patent: Dec. 21, 1999

[54] APPARATUS FOR SEALING ROTARY TUBES

[75] Inventors: Rolf Kuhn, Würzburg; Hanns Günther Mayer, Veitshöchheim, both of Germany

[73] Assignee: Noell-KRC Energie-und Umwelttechnik GmbH, Schkeuditz, Germany

[21] Appl. No.: 08/873,541

[22] Filed: Jun. 12, 1997

[30] Foreign Application Priority Data

Jun. 13, 1996 [DE] Germany .......................... 196 23 577

[51] Int. Cl.[6] ....................................................... F16J 15/34

[52] U.S. Cl. .......................... 277/364; 277/370; 277/385; 277/391; 277/903

[58] Field of Search .................................... 277/361, 364, 277/370, 379, 385, 391, 398, 903

[56] References Cited

U.S. PATENT DOCUMENTS

| | | | |
|---|---|---|---|
| 1,460,764 | 7/1923 | Neilsen et al. | 277/903 |
| 2,486,312 | 10/1949 | Mohr, Jr. et al. | 277/903 |
| 2,985,472 | 5/1961 | Schoenrock | 277/385 |
| 3,050,310 | 8/1962 | Kuiken | 277/398 |
| 3,462,160 | 8/1969 | Adams | 277/903 |
| 3,706,482 | 12/1972 | Crockett | 277/903 |
| 4,502,702 | 3/1985 | Nixon, Jr. | 277/903 |
| 4,836,560 | 6/1989 | Haberberger | 277/903 |

FOREIGN PATENT DOCUMENTS

| | | |
|---|---|---|
| 357 939 | 3/1990 | European Pat. Off. . |
| 0 431 419 | 6/1991 | European Pat. Off. . |
| 1 226 337 | 10/1966 | Germany . |
| 28 23 321 | 12/1978 | Germany . |
| 30 08 741 | 9/1981 | Germany . |
| 43 31 556 | 3/1995 | Germany . |
| 2 094 906 | 9/1982 | United Kingdom . |

OTHER PUBLICATIONS

Article entitled "Abdichtungen für Drehöfen" by Von B. Beigel appearing in Zement–Kalk–Gips dated May 1971 pp. 208–215.

*Primary Examiner*—Lynne A. Reichard
*Assistant Examiner*—David E. Bochna
*Attorney, Agent, or Firm*—Cohen, Pontani, Lieberman & Pavane

[57] ABSTRACT

An apparatus for sealing a rotary tube drum of a furnace to another furnace component. Two concentric resilient metal ring segments are provided on a disk to comprise the sealing elements of the present invention. A plurality of springs arranged as a ring apply pressure to the disk and ring segments to ensure a consistent and self-adjusting seal between the joined components. Links located circumferentially about the disk limit lateral movement, yet allow axial movement, of the seal. It is thereby possible, according to the present invention, to provide a resilient seal between a rotary tube and another component of a furnace that yields a self-adjusting gas-impermeable seal between the mating components.

2 Claims, 3 Drawing Sheets

APPARATUS FOR SEALING ROTARY TUBES

BACKGROUND OF THE INVENTION

1. Field of the Invention

The invention relates to an apparatus for sealing rotary tubes, and more particularly, to a seal that is suitable for the sealing of rotary tube drum devices, such as those used in furnaces for combustion, thermolysis, pyrolysis and similar processes.

2. Description of the Related Art

Seals are needed to achieve gas-impermeable separation between the various joined components of a furnace. For example, a gas-impermeable seal is required between a rotating tube drum and the stationary inlet and discharge housing to which the drum connects. These seals must be suitable for operation at temperatures above 750 degrees (Fahrenheit) and resistive to deformation—which tends to make the seals ineffective. The seals must also be able to withstand attacks by abrasive gases, abrasive solid particles and resinous oils and tars, and the wear associated therewith. Furthermore, the seals must be capable of sustained operation with little maintenance.

According to the prior art, rotary drums commonly use resilient elements such as, for example, gasket strips, placed into slots or other seals to achieve gas-impermeability between the various components. However, gasket strips are subject to clogging with resinous products that can lead to the ultimate failure of such seals. Moreover, seals of this type can become baked onto the sealing surfaces, i.e. onto the joints between the rotary tubes, in which event their impermeability is no longer ensured. In addition, maintenance and replacement of gasket-type seals can be expensive.

German Patent Number DE 43 31 556 A1 discloses a sliding ring seal for sealing a hot tube against a housing. The ring seal is attached to the tube by a nozzle having a central opening. The nozzle serves to lower the temperature of the sliding ring seal or alternatively, at the sealing point. A lubrication system is required to move the ring seal from the nozzle to its mounting location between the hot tube and the housing. In addition to this disadvantage, this solution requires large structural volume, and heating of the sealing points cannot be completely prevented. This creates the danger that the ring seals, which usually are large, will warp from the heat and that leaks will eventually develop, as is generally the case with linear forces applied by sliding ring seals.

German Patent Number DE-AS 1 226 377 discloses a sliding ring seal that is embodied as a rotating tube coupling between an electric vacuum melting furnace having a vacuum chamber. This sliding ring seal permits a wavy-type displacement, because the sealing ring has a resilient compensating component. However, this does not eliminate the aforementioned disadvantages of the prior art, i.e. high maintenance and replacement expense, resistance to abrasive substances, etc.

SUMMARY OF THE INVENTION

It is accordingly an object of the present invention to develop a maintenance-free seal for use on a rotary tube drum that is virtually immune to degradation due to thermal, chemical, and/or mechanical stress.

In a furnace used for combustion, thermolysis, pyrolysis, and/or other similar processes, rotary tube drums connect to other furnace components such as, for example, stationary inlets and discharge openings. The rotary tube drum and other furnace component connected thereto are typically axially aligned along the longitudinal axis of the rotary tube drum. A gas-impermeable seal is required between the joined components that is likewise typically axial with the joined furnace components and is generally formed between a sealing surface on the rotary tube drum and the seal.

The seal of the present invention includes two annular metallic segments concentrically arranged on a disk and located on a side of the disk adjacent the sealing surface. The disk and attached segments are resilient in the sealing direction, i.e. toward and away from the sealing surface, and relatively rigid at right angles thereto. A plurality of springs apply a biasing pressure to the side of the disk opposite the side to which the segments are attached at points that lie between the two annular segments. The springs, individually and collectively, bias the disk and segments toward the sealing surface of the rotary drum to form a virtually gap-free seal therebetween—the springs being designed in accordance with the rigidity and sealing pressure requirements of the disk. As a result, the disk is adaptable to a variety of sealing surfaces, including irregularities and deformities caused by heat, warpage, wear, exposure to caustic substances, etc.

The disk also serves as the seal carrier and is held in alignment between the rotary tube and the other component to which the tube mates by several links, preferably three. The links are distributed around the disk circumference and act as torque supports thereby ensuring free movement of the disk in the direction of the sealing plane, i.e. axial movement encouraged by the plurality of springs, even if the disk assumes a somewhat eccentric or skewed position with respect to the sealing plane and surface. As a result, the links create a spring-like action and can, in cooperation with the plurality of springs, automatically reposition the disk and seal as the seal wears over time. In addition, the links provide a means for adjusting the seal in such a manner that a wobbling movement occurs to self-clean the sealing surface. In this way, contraction of the seal is also avoided. The links are attached to a carrier structure, and also serve to center the sealing disk with respect to the sealing surface by means of rollers.

The disk or seal carrier, which is movable in the axial direction, i.e. toward and away from the sealing surface, is preferably connected to a structure formed by the sealing housing in a sealing manner by means of a compensating element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

The present invention provides a self-adjusting seal particularly suited for sealingly connecting a rotary tube of a furnace to another furnace component. The seal of the present invention is virtually maintenance-free and substantially immune to degradation due to exposure to caustic substances, heat, mechanical failure, and the like. Two concentric resilient metal ring segments are provided on a disk to comprise the sealing elements of the present invention. A plurality of springs arranged as a ring apply pressure to the disk and ring segments to ensure a consistent and self-adjusting seal between the joined components. It is thereby possible, according to the present invention, to provide a resilient seal between a rotary tube and another component of a furnace that yields a gas-impermeable seal between the mating components.

Figure 1:
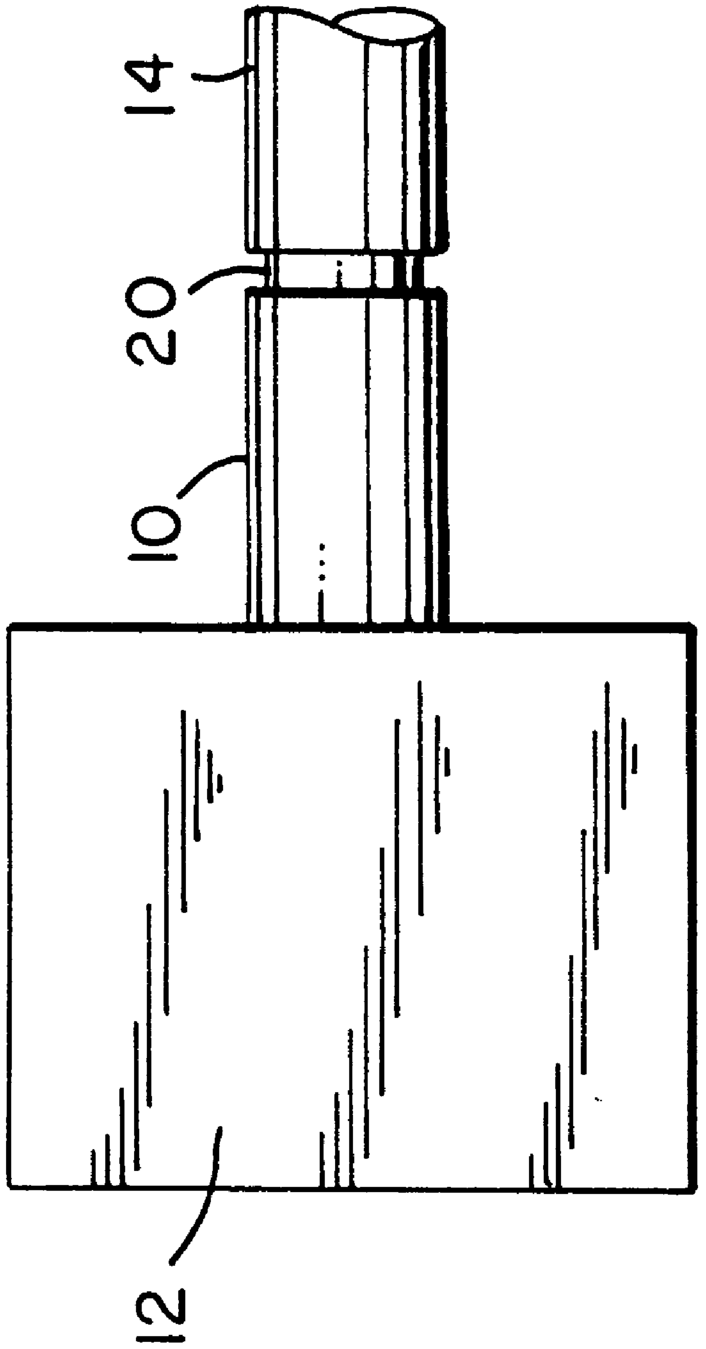
FIG. 1 is a diagrammatic view of the seal of the present invention disposed between a rotary tube drum and another furnace component.

FIG. 1 illustrates the general configuration of a furnace 12 employing the seal 20 of the present invention. A rotary tube drum 10 having a sealing surface 4 (FIG. 2) is connected to the furnace 12. Another furnace component 14 such as, for example, a stationary inlet or discharge opening, is sealingly connected to the rotary tube drum 10 by the seal 20 of the present invention.

Figure 2:
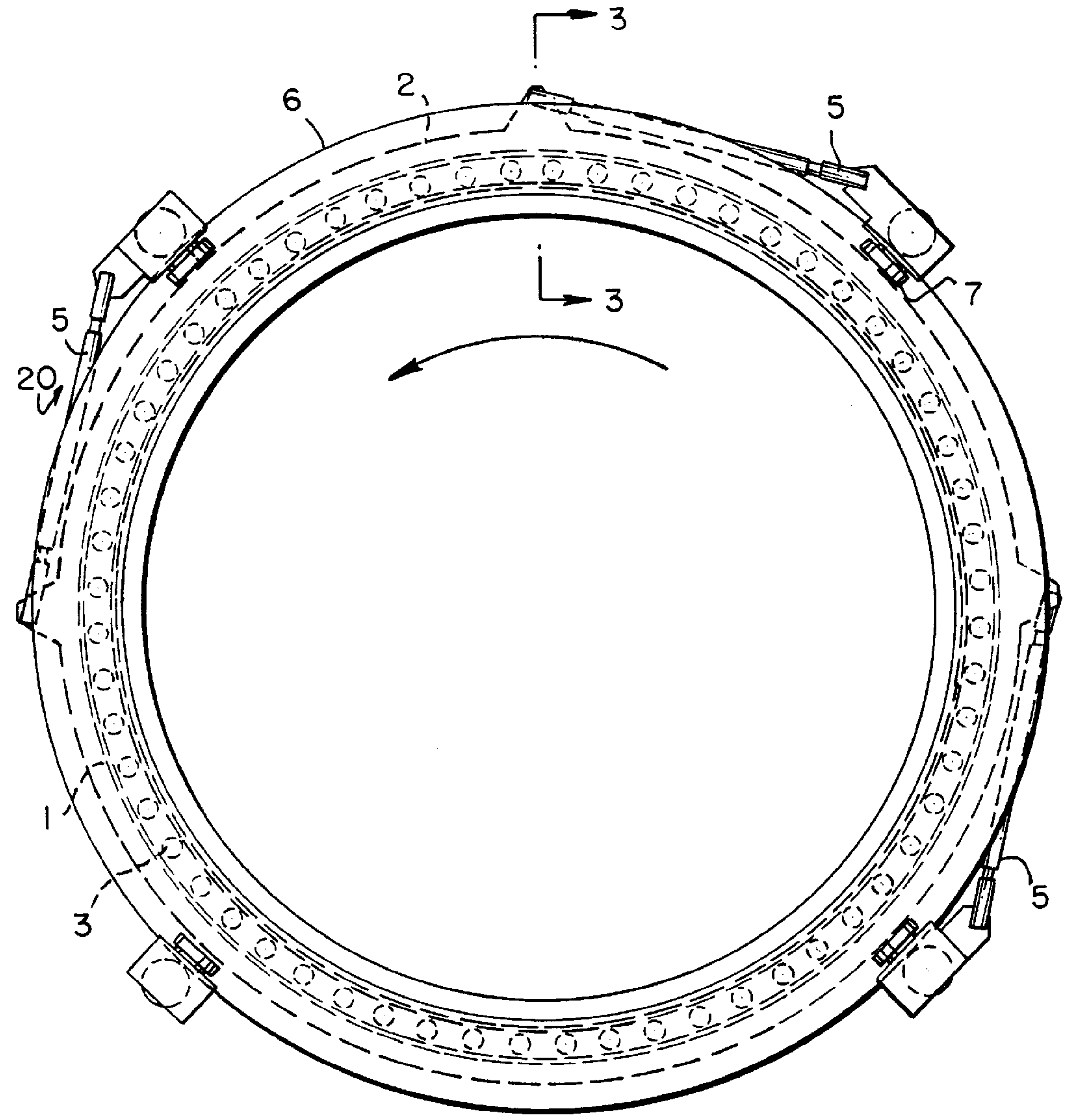
FIG. 2 is a front plan view of seal according to the present invention.
Figure 3:
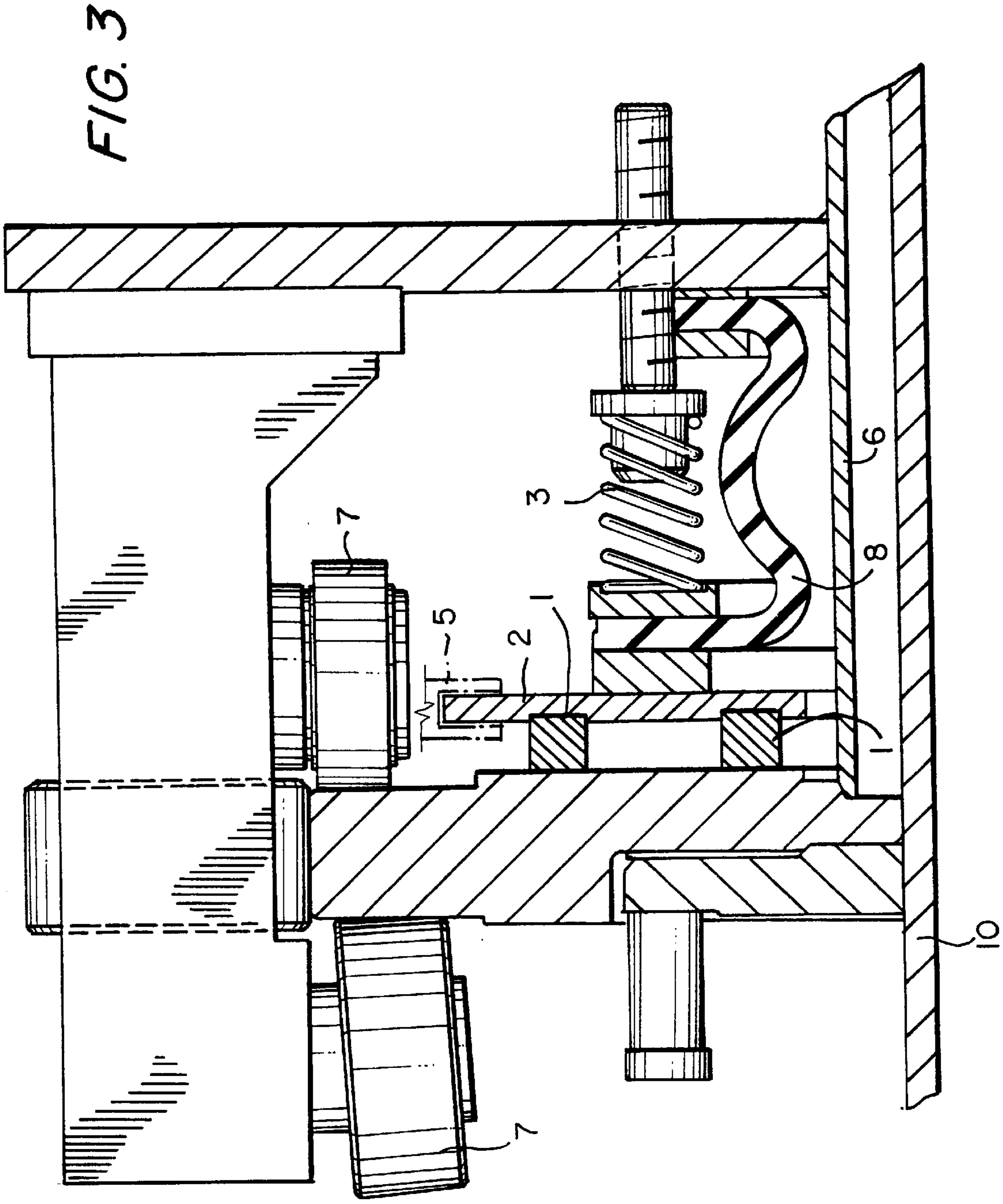
FIG. 3 is a longitudinal cross-section taken along the line A—A of FIG. 2, showing the seal arrangement of the present invention.

The seal 20 of present invention will now be discussed in greater detail with reference to FIGS. 1 and 2. The seal 20 comprises two concentrically disposed annular resilient metal sliders 1 connected to a disk or seal carrier 2. A plurality of springs 3, arranged in a circle, individually and collectively apply pressure to a side of the disk opposite the side on which the metal sliders 1 are connected. The plurality of springs 3 bias the disk 2 and attached metal sliders 1, i.e. the seal, toward the rotary tube drum 10 to form a virtually gap-free, gas-impermeable seal between the rotary tube drum 10 and the another furnace component 14, i.e. the metal sliders 1 are pressed onto the rotating sealing surface 4 of the rotary tube drum 10 to form a virtually gap-free connection therebetween. To insure axial alignment between the rotary tube drum 10 and other furnace component 14 to which the seal 20 of the present invention is connected, a plurality of rollers 7 are provided that rollingly contact opposite sides of the sealing surface 4 in a sandwich-like manner.

Three links 5 are circumferentially attached to the disk or seal carrier 2 to center the seal 20 on the sealing surface 4. The links 5 also serve to substantially prevent lateral movement of the seal 20 with respect to the sealing surface 4 while permitting axial movement with respect thereto. Accordingly, proper alignment between the seal 20 and the rotating surface 4 is further assured without hindering or otherwise impairing the self-adjusting feature of the present invention, i.e. the ability of the seal to automatically adapt to changes on the rotating surface 4 or in the metal sliders 1.

The disk or seal carrier 2 is sealingly connected to the seal housing 6 by a compensating element 8.

In operation, the rotary tube drum 10 and another furnace component 14 are sealingly connected using the seal 20 of the present invention. The seal 20 is connected to the another furnace component 14 by any number of known methods and the rotary tube drum 10, seal 20 and another furnace component 14 are substantially aligned along the longitudinal axis of the rotary tube drum 10. Once the seal 20 is in place, the two concentric resilient metal sliders 1 and the disk 2 are biased toward the rotating sealing surface 4 by the plurality of springs 3 to form a virtually gap-free, gas-impermeable seal between the joined components. The resilience of the metal sliders 1 provides an economical, robust, and virally maintenance-free sealing connection between the rotary tube drum 10 and the another furnace component 14. In addition, the springs 3 and links 5, separately and in combination, self-adjust the sealing connection by constantly urging the disk 2 and metal slider 1 into contact with the rotating sealing surface 4. Accordingly, any changes in the surface of the rotating sealing surface 4 and/or in the metal sliders 1 will not impact the seal between the furnace components, since a reliable and consistent seal is ensured by the present invention. The compensating element 8 sealingly connects disk or seal carrier 2 with the seal housing 6. Additional axial alignment between the mating components is provided by the rollers 7, located in sandwich-like relation on opposite sides of a stepped down portion of the rotating sealing surface 4.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. An apparatus for sealingly connecting a rotary tube drum to another component, the rotary tube drum defining a longitudinal axis and having a sealing surface, said apparatus comprising:

a seal comprising a seal carrier having a metal slider affixed to a side thereof, said seal being disposed between the rotary tube drum and the another component and being resilient in the direction of the longitudinal axis of the rotary tube drum;

a seal housing;

a plurality of springs for biasing said seal carrier toward the sealing surface thereby forming a substantially gap-free connection between said seal and the sealing surface;

three links connected to said seal carrier, said three links substantially permitting movement of said seal carrier in the direction of the longitudinal axis of the rotary tube drum and substantially preventing movement of said seal carrier in a direction traverse to the longitudinal axis; and a plurality of rollers mounted to the housing so as to oppose one another and rollingly contact a stepped-down portion of the tube drum adjacent the sealing surface so as to sandwich the stepped-down portion between the opposing rollers and center said seal housing on the sealing surface.

2. The apparatus of claim 1, further comprising a compensating element that seals said seal carrier relative to said seat housing.

* * * * *